United States Patent
Lee et al.

(10) Patent No.: US 9,380,605 B1
(45) Date of Patent: Jun. 28, 2016

(54) ALLOCATING RESOURCES IN A WIRELESS COMMUNICATION SYSTEM

(71) Applicant: Sprint Spectrum LP, Overland Park, KS (US)

(72) Inventors: Kyounghwan Lee, Newark (DE); Daniel Vivanco, Sterling, VA (US); Vijendrakumar Ashiwal, Pittsburg, PA (US); Karan Raj Sachdev, Austin, TX (US)

(73) Assignee: Sprint Spectrum L.P., Overland Park, KS (US)

( * ) Notice: Subject to any disclaimer, the term of this patent is extended or adjusted under 35 U.S.C. 154(b) by 314 days.

(21) Appl. No.: 13/947,005

(22) Filed: Jul. 19, 2013

(51) Int. Cl.
*H04W 74/08* (2009.01)

(52) U.S. Cl.
CPC ................................ *H04W 74/0833* (2013.01)

(58) Field of Classification Search
None
See application file for complete search history.

(56) References Cited

U.S. PATENT DOCUMENTS

| | | | |
|---|---|---|---|
| 5,673,259 A * | 9/1997 | Quick, Jr. ...................... 370/342 |
| 5,991,633 A * | 11/1999 | Corriveau et al. ............. 455/466 |
| 6,978,143 B1 * | 12/2005 | Vialen ......................... 455/452.2 |
| 7,065,366 B2 * | 6/2006 | Cave .............................. 455/450 |
| 7,957,298 B2 * | 6/2011 | Yi et al. ......................... 370/242 |
| 8,259,659 B2 * | 9/2012 | Luft et al. ...................... 370/329 |
| 8,345,654 B2 * | 1/2013 | Parkvall et al. ................ 370/342 |
| 8,805,362 B2 * | 8/2014 | Amirijoo et al. .............. 455/434 |
| 9,019,823 B1 * | 4/2015 | Raparthy et al. ............... 370/230 |
| 9,084,210 B2 * | 7/2015 | Ishii ..................... H04W 52/367 |
| 2001/0039499 A1 | 11/2001 | Zhang et al. |
| 2009/0046667 A1 * | 2/2009 | Pelletier et al. ............... 370/335 |
| 2010/0232318 A1 * | 9/2010 | Sarkar ........................... 370/254 |
| 2013/0182668 A1 * | 7/2013 | Xu et al. ........................ 370/329 |
| 2013/0286958 A1 * | 10/2013 | Liang et al. ................... 370/329 |
| 2014/0016573 A1 * | 1/2014 | Nuggehalli et al. ........... 370/329 |
| 2014/0098693 A1 * | 4/2014 | Tabet et al. .................... 370/252 |
| 2014/0233379 A1 * | 8/2014 | Chu ....................... H04W 48/06 370/230 |
| 2015/0003363 A1 * | 1/2015 | Shi ......................... H04W 88/08 370/329 |

* cited by examiner

*Primary Examiner* — Gregory Sefcheck

(57) ABSTRACT

Loading information of an access node and a random access failure rate at the access node are determined, wherein the access node is using a first physical random access channel (PRACH) configuration index. Based on the comparison of the loading information to a loading criteria and the comparison of the random access failure rate to a failure rate criteria, a second PRACH configuration index is selected for the access node.

10 Claims, 6 Drawing Sheets

| PRACH Configuration Index | Preamble Format | System frame number | Subframe number |
|---|---|---|---|
| 0 | 0 | Even | 1 |
| 1 | 0 | Even | 4 |
| 2 | 0 | Even | 7 |
| 3 | 0 | Any | 1 |
| 4 | 0 | Any | 4 |
| 5 | 0 | Any | 7 |
| 6 | 0 | Any | 1, 6 |
| 7 | 0 | Any | 2, 7 |
| 8 | 0 | Any | 3, 8 |
| 9 | 0 | Any | 1, 4, 7 |
| 10 | 0 | Any | 2, 5, 8 |
| 11 | 0 | Any | 3, 6, 9 |
| 12 | 0 | Any | 0, 2, 4, 6, 8 |
| 13 | 0 | Any | 1, 3, 5, 7, 9 |
| 14 | 0 | Any | 0, 1, 2, 3, 4, 5, 6, 7, 8, 9 |
| 15 | 0 | Even | 9 |
| 16 | 1 | Even | 1 |
| 17 | 1 | Even | 4 |
| 18 | 1 | Even | 7 |
| 19 | 1 | Any | 1 |
| 20 | 1 | Any | 4 |
| 21 | 1 | Any | 7 |
| 22 | 1 | Any | 1, 6 |
| 23 | 1 | Any | 2, 7 |
| 24 | 1 | Any | 3, 8 |
| 25 | 1 | Any | 1, 4, 7 |
| 26 | 1 | Any | 2, 5, 8 |
| 27 | 1 | Any | 3, 6, 9 |
| 28 | 1 | Any | 0, 2, 4, 6, 8 |
| 29 | 1 | Any | 1, 3, 5, 7, 9 |
| 30 | N/A | N/A | N/A |
| 31 | 1 | Even | 9 |
| 32 | 2 | Even | 1 |
| 33 | 2 | Even | 4 |
| 34 | 2 | Even | 7 |
| 35 | 2 | Any | 1 |
| 36 | 2 | Any | 4 |
| 37 | 2 | Any | 7 |
| 38 | 2 | Any | 1, 6 |
| 39 | 2 | Any | 2, 7 |
| 40 | 2 | Any | 3, 8 |
| 41 | 2 | Any | 1, 4, 7 |
| 42 | 2 | Any | 2, 5, 8 |
| 43 | 2 | Any | 3, 6, 9 |
| 44 | 2 | Any | 0, 2, 4, 6, 8 |
| 45 | 2 | Any | 1, 3, 5, 7, 9 |
| 46 | N/A | N/A | N/A |
| 47 | 2 | Even | 9 |
| 48 | 3 | Even | 1 |
| 49 | 3 | Even | 4 |
| 50 | 3 | Even | 7 |
| 51 | 3 | Any | 1 |
| 52 | 3 | Any | 4 |
| 53 | 3 | Any | 7 |
| 54 | 3 | Any | 1, 6 |
| 55 | 3 | Any | 2, 7 |
| 56 | 3 | Any | 3, 8 |
| 57 | 3 | Any | 1, 4, 7 |
| 58 | 3 | Any | 2, 5, 8 |
| 59 | 3 | Any | 3, 6, 9 |
| 60 | N/A | N/A | N/A |
| 61 | N/A | N/A | N/A |
| 62 | N/A | N/A | N/A |
| 63 | 3 | Even | 9 |

FIG. 2

ALLOCATING RESOURCES IN A WIRELESS COMMUNICATION SYSTEM

TECHNICAL BACKGROUND

In a wireless communication system, a wireless device communicates with an access node using a wireless communication link. The physical layer of the wireless communications link, such as a frequency or frequencies, can comprise one or more logical channels. Communications from the access node to the wireless device are typically referred to as downlink communications, and communications from the wireless device to the access node are typically referred to as uplink communications.

Each of the uplink and downlink communications can comprise one or more portions for bearer data, for example, related to voice or data communications, and one or more portions for non-bearer data. The physical random access channel (PRACH) is a physical channel in the uplink which is used for non-bearer data, such as network entry and wireless link resource requests. Physical resources, such as sub-frames, which are allocated to the PRACH typically cannot be used to carry other information, such including bearer data.

Overview

In operation, loading information of an access node and a random access failure rate at the access node are determined, where the access node is using a first physical random access channel (PRACH) index. The loading information is compared to a loading criteria, and the random access failure rate is compared to a failure rate criteria. Based on the comparison of the loading information to the loading criteria and the comparison of the random access failure rate to the failure rate criteria, a second PRACH configuration index is selected for the access node.

BRIEF DESCRIPTION OF THE DRAWINGS

FIG. 2 illustrates an exemplary table of physical random access channel configuration indices.

DETAILED DESCRIPTION

Figure 1:
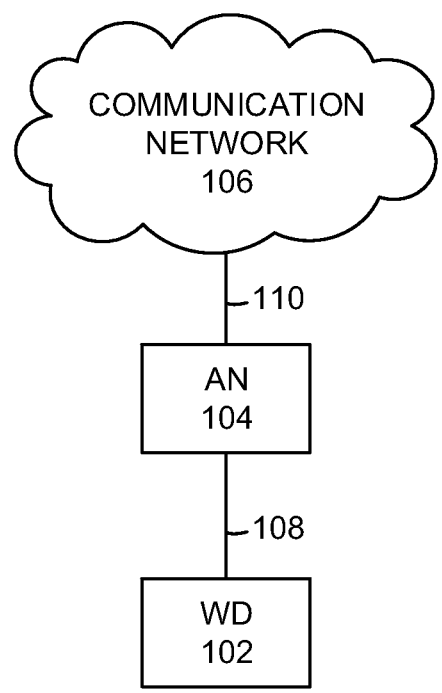
FIG. 1 illustrates an exemplary communication system to allocate resources in a wireless communication system.

FIG. 1 illustrates an exemplary communication system 100 to allocate resources in a wireless communication system comprising wireless device 102, access node 104, and communication network 106. Examples of wireless device 102 can comprise a cell phone, a smart phone, a computing platform such as a laptop, palmtop, or tablet, a personal digital assistant, or an internet access device, including combinations thereof. Wireless device 102 is in communication with access node 104 over communication link 108.

Access node 104 is a network node capable of providing wireless communications to wireless device 102, and can be, for example, a base transceiver station, a radio base station, an eNodeB device, or an enhanced eNodeB device. Access node 104 is in communication with communication network 106 over communication link 110.

Communication network 106 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication network 106 can be capable of carrying voice information and other data, for example, to support communications by a wireless device such as wireless device 102. Wireless network protocols may comprise code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, Worldwide Interoperability for Microwave Access (WiMAX), and Third Generation Partnership Project Long Term Evolution (3GPP LTE). Wired network protocols that may be utilized by communication network 106 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 106 may also comprise a wireless network, including base stations, wireless communication nodes, telephony switches, internet routers, network gateways, computer systems, communication links, or some other type of communication equipment, and combinations thereof.

Communication links 108 and 110 can be wired or wireless communication links. Wired communication links can comprise, for example, twisted pair cable, coaxial cable or fiber optic cable, or combinations thereof. Wireless communication links can comprise a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used.

Other network elements may be present in communication system 100 to facilitate wireless communication but are omitted for clarity, such as base stations, base station controllers, gateways, mobile switching centers, dispatch application processors, and location registers such as a home location register or visitor location register. Furthermore, other network elements may be present to facilitate communication between access node 104 and communication network 106 which are omitted for clarity, including additional processing nodes, routers, gateways, and physical and/or wireless data links for carrying data among the various network elements.

Wireless communication link 108 can comprise a downlink portion for communications from the access node to the wireless device and an uplink portion for communications from the wireless device to the access node. Each of the uplink and downlink communications can comprise one or more portions for bearer data, for example, related to voice or data communications, and one or more portions for non-bearer data.

The physical random access channel (PRACH) is a physical channel in the uplink which can be used to convey non-bearer data, such as network entry and wireless link resource requests. Physical resources, such as sub-frames, are typically allocated statically to the PRACH. Resources allocated to the PRACH typically cannot be used to carry other information, such as bearer data. Allocation of sub-frames to the PRACH must therefore be balanced against bearer data transport requirements. Where too many sub-frames (or other physical resources) are allocated to the PRACH, wireless communication link congestion can increase since too few sub-frames are allocated for bearer data. Where too few sub-frames are allocated to the PRACH, the establishment of initial communication and network entry processes can be delayed for a wireless device.

PRACH configuration can be organized according to a PRACH configuration index, and example of which is illustrated in FIG. 2. A PRACH preamble comprises a format which typically includes different length cyclic prefixes, symbol sequences, and guard periods. Each PRACH configuration further includes one or more sub-frames. The format of the PRACH preamble dictates acceptable access node transmission radius, based in part on the guard period which indicates a maximum permissible round trip delay for a given reception window at an access node. So, for example, within preamble format of 0, sixteen PRACH configuration indices are available, indices 0-15. PRACH configuration indices can be grouped together according to the number of sub-frames allocated to the PRACH. For example, PRACH configuration indices 0-5 can comprise a first group, with one sub-frame allocated to the PRACH; PRACH configuration indices 6-8 can comprise a second group, with two sub-frames allocated to the PRACH; and so forth.

When physical resources are statically allocated to the PRACH, the allocation is not responsive to changing network conditions, and may result in increased wireless communication link congestion (where too many resources are allocated to the PRACH for the current conditions), or may create delay in the establishment of initial communication and network entry processes (were too few resources are allocated to the PRACH). In operation, loading information of access node 104 and a random access failure rate at access node 104 are determined, wherein access node 104 is using a first PRACH configuration index. The loading information is compared to a loading criteria, and the random access failure rate is compared to a failure rate criteria. A second PRACH configuration index is selected based on the comparison of the loading information to the loading criteria and the comparison of the random access failure rate to the failure rate criteria. In an embodiment, the first and second PRACH configuration index comprise the same preamble format, to maintain the transmission radius of the access node.

Figure 3:
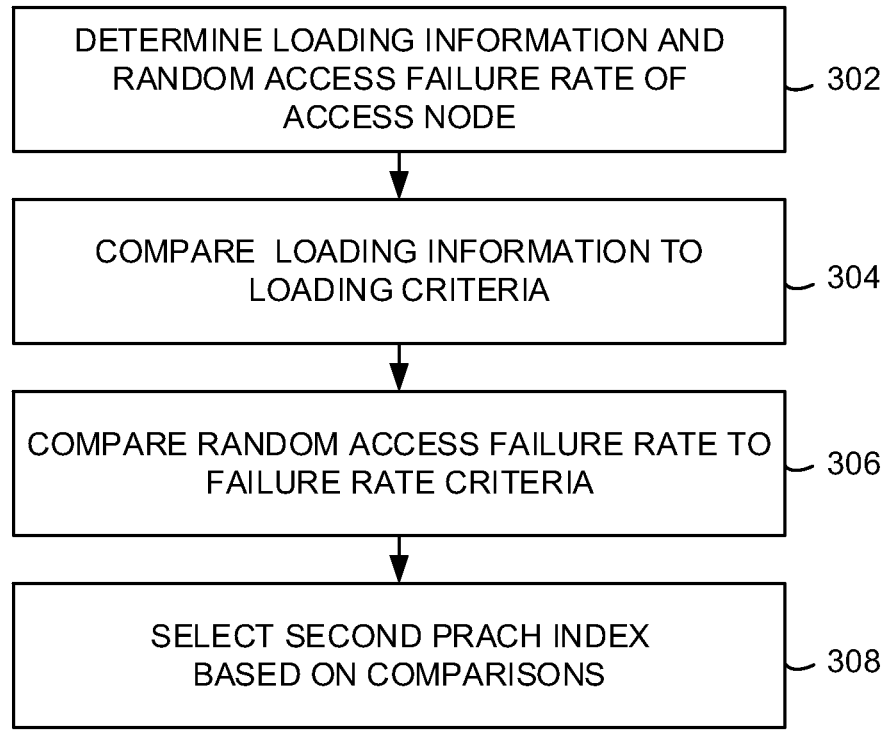
FIG. 3 illustrates an exemplary method of allocating resources in a wireless communication system.

FIG. 3 illustrates an exemplary method of allocating resources in a wireless communication system. Loading information of an access node and a random access failure rate at the access node are determined, wherein the access node is using a first PRACH configuration index (operation 302). For example, access node 104 can use PRACH configuration index 6 (FIG. 2) comprising two sub-frames, 1 and 6, allocated to the PRACH. Loading information of wireless communication link 108 can be determined by access node 104, or by another network element such as a controller node, gateway node, or another network element of communication system 100. Loading information can comprise a demand for wireless communication link resources, such as a utilization of resources such as sub-frames for bearer data, a utilization of physical resource blocks (PRBs) by wireless devices in communication with access node 104, and the like. Loading information can also comprise requests for wireless communication link resources, such as a level of resources requested in a buffer status report (BSR) or similar request for wireless communication link resources.

The loading information is compared to a loading criteria (operation 304), and the random access failure rate is compared to a failure rate criteria (operation 306). The loading information can comprise a wireless communication link resource utilization, such as a number of physical resource blocks used for wireless communication per unit time, or a number of sub-frames used per unit time, an amount of bandwidth consumed per unit time, a number of slots used per unit time, an amount of wireless communication link resources used and/or requested for use by a wireless device, and the like, including combinations thereof. In an embodiment, the loading information meets the loading criteria when the loading information is greater than or equal to a threshold loading level.

Regarding the random access failure rate, a wireless device which does not have an allocated uplink resource can use a procedure to request uplink resources, such as a random access procedure, to request uplink resources from an access node. For example, wireless device 102 can selecting a contention-based random access preamble and transmit the selected preamble on the PRACH to access node 104. A rejection of the resource request by access node 104, or a failure by access node 104 to respond to a resource request, can be deemed a random access failure. A number of random access failures during a period of time can comprise a random access failure rate. In an embodiment, the random access failure rate meets the failure rate criteria when the random access failure rate is greater than or equal to a failure rate threshold.

In operation 308, a second PRACH configuration index is selected based on the comparison of the loading information to the loading criteria and the comparison of the random access failure rate to the failure rate criteria. For example, when the loading information is greater than or equal to a threshold loading level, and the random access failure rate is greater than or equal to a failure rate threshold, a second PRACH configuration index is selected. The selection of a second PRACH configuration index enables a dynamic allocation of sub-frames to the physical random access channel which is responsive to the loading information and/or to the rate of random access failure at an access node.

Figure 4:
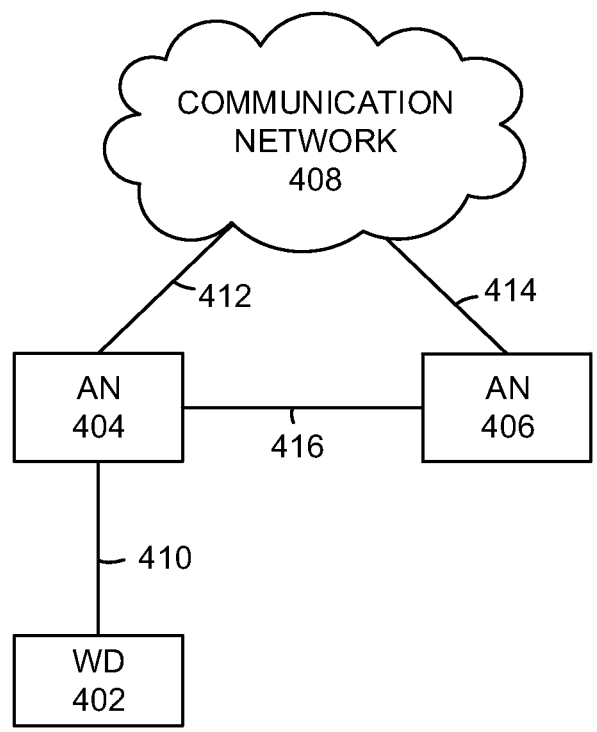
FIG. 4 illustrates another exemplary system to allocate resources in a wireless communication system.

FIG. 4 illustrates another exemplary system 400 to allocate resources in a wireless communication system comprising wireless device 402, access node 404, access node 406, and communication network 408. Examples of wireless device 402 can comprise a cell phone, a smart phone, a computing platform such as a laptop, palmtop, or tablet, a personal digital assistant, or an internet access device, including combinations thereof. Wireless device 402 is in communication with access node 404 over communication link 410.

Access nodes 404 and 406 are each a network node capable of providing wireless communications to wireless device 402, and can be, for example, a base transceiver station, a radio base station, an eNodeB device, or an enhanced eNodeB device. Access node 404 is in communication with communication network 408 over communication link 412, and access node 406 is in communication with communication network 408 over communication link 414. Access nodes 404 and 406 can also communicate with each other over communication link 416.

Communication network 408 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication network 408 can be capable of carrying voice information and other data, for example, to support communications by a wireless device such as wireless device 402. Wireless network protocols may comprise code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, Worldwide Interoperability for Microwave Access (WiMAX), and Third Generation Partnership Project Long Term Evolution (3GPP LTE). Wired network protocols that may be utilized by communication network 408 comprise Ethernet, Fast Ethernet, Gigabit Ethernet, LocalTalk (such as Carrier Sense Multiple Access with Collision Avoidance), Token Ring, Fiber Distributed Data Interface (FDDI), and Asynchronous Transfer Mode (ATM). Communication network 408 may also comprise a wireless network, including base stations, wireless communication nodes, telephony switches, internet routers, network gateways, computer systems, communication links, or some other type of communication equipment, and combinations thereof.

Communication links 410, 412, 414 and 416 can be wired or wireless communication links. Wired communication links can comprise, for example, twisted pair cable, coaxial cable or fiber optic cable, or combinations thereof. Wireless communication links can comprise a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used.

Other network elements may be present in communication system 400 to facilitate wireless communication but are omitted for clarity, such as base stations, base station controllers, gateways, mobile switching centers, dispatch application processors, and location registers such as a home location register or visitor location register. Furthermore, other network elements may be present to facilitate communication between access node 104, access node 406 and communication network 408 which are omitted for clarity, including additional processing nodes, routers, gateways, and physical and/or wireless data links for carrying data among the various network elements.

Wireless communication link 410 can comprise a downlink portion for communications from the access node to the wireless device and an uplink portion for communications from the wireless device to the access node. Each of the uplink and downlink communications can comprise one or more portions for bearer data, for example, related to voice or data communications, and one or more portions for non-bearer data. The uplink can further comprise a physical random access channel (PRACH) which can be used for network entry and wireless link resource requests. Physical resources, such as sub-frames, can be allocated to the PRACH. Where too many sub-frames are allocated to the PRACH, wireless communication link congestion can increase since too few sub-frames are allocated for bearer data.

Figure 5:
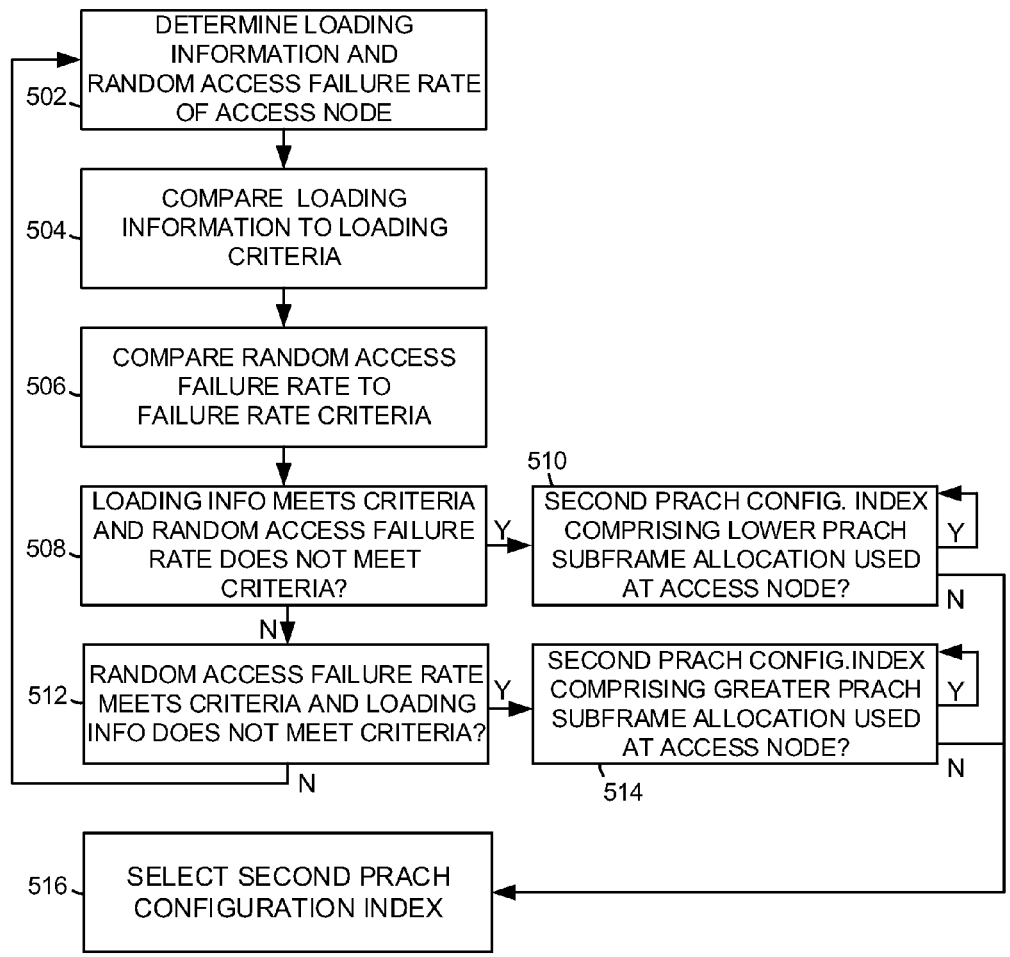
FIG. 5 illustrates another exemplary method of allocating resources in a wireless communication system.

FIG. 5 illustrates another exemplary method of allocating resources in a wireless communication system. Loading information of an access node and a random access failure rate at the access node are determined, wherein the access node is using a first PRACH configuration index (operation 502). For example, access node 404 can use a PRACH configuration index comprising a number of sub-frames allocated to the PRACH. Loading information of wireless communication link 410 can be determined by access node 404, or by another network element such as a controller node, gateway node, or another network element of communication system 400. Loading information can comprise a demand for wireless communication link resources, such as a utilization of resources such as sub-frames for bearer data, a utilization of physical resource blocks (PRBs) by wireless devices in communication with access node 404, and the like. Loading information can also comprise requests for wireless communication link resources, such as a level of resources requested in a buffer status report (BSR) or similar request for wireless communication link resources.

The loading information is compared to a loading criteria (operation 504), and the random access failure rate is compared to a failure rate criteria (operation 506). The loading information can comprise a wireless communication link resource utilization, such as a number of physical resource blocks used for wireless communication per unit time, or a number of sub-frames used per unit time, an amount of bandwidth consumed per unit time, a number of slots used per unit time, an amount of wireless communication link resources used and/or requested for use by a wireless device, and the like, including combinations thereof. The loading information can further comprise a utilization of backhaul communication resources, such as a loading of communication link 412 and/or communication links within communication network 408.

In an embodiment, the loading information meets the loading criteria when the loading information is greater than or equal to a threshold loading level. A rejection of the resource request by access node 404, or a failure by access node 404 to respond to a resource request, can be deemed a random access failure. A number of random access failures during a period of time can comprise a random access failure rate. In an embodiment, the random access failure rate meets the failure rate criteria when the random access failure rate is greater than or equal to a failure rate threshold.

In operation 508, it is determined whether the loading information meets the loading criteria and whether the random access failure rate does not meet the failure rate criteria. When access node 404 is highly loaded, more communication resources are required to carry bearer data, and when the rate of random access failure is relatively low, it is likely that additional resources can be allocated for bearer traffic without negatively affecting the random access failure or success rate. When the loading information meets the loading criteria (operation 508-Y), a second PRACH configuration index can be selected comprising fewer sub-frames allocated to the PRACH than the first PRACH configuration index. For example, referring to FIG. 2, where the first PRACH configuration index is index 6, comprising sub-frames 1 and 6 allocated to the PRACH, second sub-frame 5 can be selected comprising sub-frame 7 allocated to the PRACH. In this example, the second PRACH configuration index can be selected from among the group of PRACH configuration indices 0, 1, 2, 3, 4 and 5. In an embodiment, when the loading information meets the loading criteria and the random access failure rate does not meet the failure rate criteria a second PRACH configuration index can be selected comprising fewer sub-frames allocated to the PRACH than the first PRACH configuration index.

The format of the PRACH preamble determines the transmission radius of an access node, based in large part on the guard period which indicates a maximum permissible round trip delay for a given reception window at an access node. Where the preamble format of the first PRACH configuration index is 0, the second PRACH configuration index should be selected from among the other PRACH indices comprising the same preamble format. In an embodiment, the first PRACH configuration index and the second PRACH configuration index comprise the same preamble format. For example, sub-frame indices 0-15 comprise preamble format 0, so where the first PRACH configuration index is index 6, comprising sub-frames 1 and 6 allocated to the PRACH, second PRACH configuration index 5 can be selected comprising sub-frame 7 allocated to the PRACH.

Returning to FIG. 5, in operation 510, is it determined whether the second PRACH configuration index is used at a neighbor access node. For example, access node 404 can determine whether the second PRACH configuration index is used at neighbor access node 406. Access nodes 404 and 406 can communicate such information over communication link 416. When the second PRACH configuration index is in use at the second access node (operation 510-Y), then a new second PRACH configuration index is selected, to avoid interference between the PRACH at the first access node (access node 404) and the PRACH at the second access node (access node 406). When the second PRACH configuration index is not used at the second access node (operation 510-N), then the second PRACH is selected for use at the first access node (operation 516).

In operation 512, when the random access failure rate meets the failure rate criteria (alone or together with when the loading information does not meet the loading criteria) (operation 508-Y), a second PRACH configuration index can be selected comprising more sub-frames allocated to the PRACH than the first PRACH configuration index. For example, where the first PRACH configuration index is index 6 (FIG. 2), comprising sub-frames 1 and 6 allocated to the PRACH, second PRACH configuration index 9 can be selected comprising sub-frames 1, 4 and 7 allocated to the PRACH. In this example, the second PRACH configuration index can be selected from among the group of PRACH configuration indices 9, 10 and 11. In an embodiment, when the loading information meets the loading criteria and the random access failure rate does not meet the failure rate criteria a second PRACH configuration index can be selected comprising fewer sub-frames allocated to the PRACH than the first PRACH configuration index.

Referring again to FIG. 5, in operation 514, is it determined whether the second PRACH configuration index is used at a neighbor access node. When the second PRACH configuration index is in use at the second access node (operation 514-Y), then a new second PRACH configuration index is selected, to avoid interference between the PRACH at the first access node (access node 404) and the PRACH at the second access node (access node 406). When the second PRACH configuration index is not used at the second access node (operation 514-N), then the second PRACH is selected for use at the first access node (operation 516). The selection of the second PRACH configuration index enables a dynamic allocation of sub-frames to the physical random access channel which is responsive to the loading information and/or to the rate of random access failure at an access node.

Figure 6:
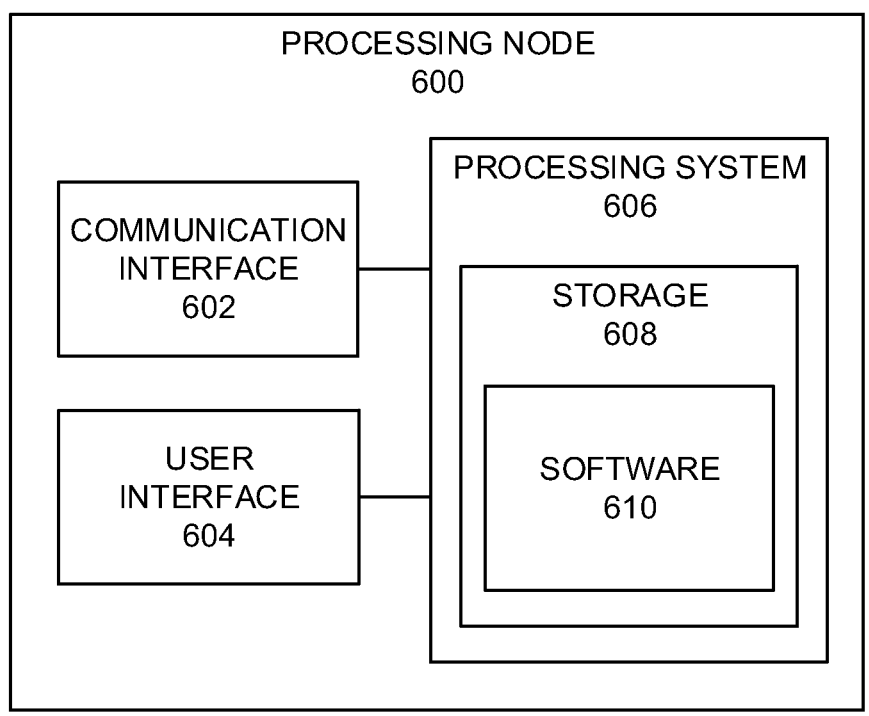
FIG. 6 illustrates an exemplary processing node.

FIG. 6 illustrates an exemplary processing node 600 in a communication system. Processing node 600 comprises communication interface 602, user interface 604, and processing system 606 in communication with communication interface 602 and user interface 604. Processing node 600 can be configured to allocate resources in a wireless communication system, such as allocating sub-frames to a physical random access channel. Processing system 606 includes storage 608, which can comprise a disk drive, flash drive, memory circuitry, or other memory device. Storage 608 can store software 610 which is used in the operation of the processing node 600. Storage 608 may include a disk drive, flash drive, data storage circuitry, or some other memory apparatus. Software 610 may include computer programs, firmware, or some other form of machine-readable instructions, including an operating system, utilities, drivers, network interfaces, applications, or some other type of software. Processing system 606 may include a microprocessor and other circuitry to retrieve and execute software 610 from storage 608. Processing node 600 may further include other components such as a power management unit, a control interface unit, etc., which are omitted for clarity. Communication interface 602 permits processing node 600 to communicate with other network elements. User interface 604 permits the configuration and control of the operation of processing node 600.

Examples of processing node 600 include access node 104 and access node 404. Processing node 600 can also be an adjunct or component of a network element, such as an element of access nodes 104 or 404. Processing node 600 can also be another network element in a communication system. Further, the functionality of processing node 600 can be distributed over two or more network elements.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention, and that various modifications may be made to the configuration and methodology of the exemplary embodiments disclosed herein without departing from the scope of the present teachings. Those skilled in the art also will appreciate that various features disclosed with respect to one exemplary embodiment herein may be used in combination with other exemplary embodiments with appropriate modifications, even if such combinations are not explicitly disclosed herein. As a result, the invention is not limited to the specific embodiments described above, but only by the following claims and their equivalents.

What is claimed is:

1. A method of allocating resources in a wireless communication system, comprising:
   determining loading information of an access node and a random access failure rate at the access node, wherein the access node is using a first physical random access channel (PRACH) configuration index;
   comparing the loading information to a loading criteria, the loading information meeting the loading criteria when the loading information satisfies a physical resource block (PRB) utilization threshold;

comparing the random access failure rate to a failure rate criteria, the random access failure rate meeting the failure rate criteria when a number of random access failures during a period of time is greater than or equal to a failure rate threshold; and selecting a second PRACH configuration index comprising fewer sub-frames allocated to a PRACH channel than the first PRACH configuration index from a group of PRACH configuration indices, the PRACH configuration indices enabling dynamic allocation of sub-frames to the PRACH channel, when the loading information meets the loading criteria and the random access failure rate does not meet the failure rate criteria.

2. The method of claim 1, wherein the loading information further comprises a utilization of wireless communication link resources.

3. The method of claim 2, wherein the loading information further comprises a utilization of backhaul communication resources.

4. The method of claim 1, wherein the first and second PRACH configuration index comprise the same preamble format.

5. The method of claim 1, further comprising selecting the second PRACH configuration index when the second PRACH configuration index is not used at a neighbor access node based on the comparison of the loading information to the loading criteria and the comparison of the random access failure rate to the failure rate criteria.

6. A method of allocating resources in a wireless communication system, comprising:

determining loading information of an access node and a random access failure rate at the access node, wherein the access node is using a first physical random access channel (PRACH) configuration index;

comparing the loading information to a loading criteria, the loading information meeting the loading criteria when the loading information satisfies a physical resource block (PRB) utilization threshold;

comparing the random access failure rate to a failure rate criteria, the random access failure rate meeting the failure rate criteria when a number of random access failures during a period of time is greater than or equal to a failure rate threshold;

selecting a second PRACH configuration index comprising a greater number of sub-frames allocated to a PRACH channel than the first PRACH configuration index from a group of PRACH configuration indices, the PRACH configuration indices enabling dynamic allocation of sub-frames allocated to the PRACH channel, when the random access failure rate meets the failure rate criteria and the loading information does not meet the loading criteria.

7. A system for allocating resources in a wireless communication system, comprising:

a processing node configured to:

determine loading information of an access node and a random access failure rate at the access node, wherein the access node is using a first physical random access channel (PRACH) configuration index;

compare the loading information to a loading criteria, the loading information meeting the loading criteria when the loading information satisfies a physical resource block (PRB) utilization threshold;

compare the random access failure rate to a failure rate criteria, the random access failure rate meeting the failure rate criteria when a number of random access failures during a period of time is greater than or equal to a failure rate threshold; and select a second PRACH configuration index comprising a greater number of sub-frames allocated to a PRACH channel than the first PRACH configuration index from a group of PRACH configuration indices, the PRACH configuration indices enabling dynamic allocation of sub-frames to a PRACH channel, when the random access failure rate meets the failure rate criteria and the loading information does not meet the loading criteria.

8. The system of claim 7, wherein the loading information further comprises at least one of a utilization of wireless communication link resources and a utilization of backhaul communication resources.

9. The system of claim 7, further comprising selecting a second PRACH configuration index comprising fewer sub-frames allocated to the PRACH channel than the first PRACH configuration index when the loading information meets the loading criteria and the random access failure rate does not meet the failure rate criteria.

10. The system of claim 7, wherein the processing node is further configured to select the second PRACH configuration index when the second PRACH configuration index is not used at a neighbor access node based on the comparison of the loading information to the loading criteria and the comparison of the random access failure rate to the failure rate criteria.

* * * * *